US006512538B1

(12) United States Patent
Hollier

(10) Patent No.: US 6,512,538 B1
(45) Date of Patent: Jan. 28, 2003

(54) SIGNAL PROCESSING

(75) Inventor: Michael Peter Hollier, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/180,298

(22) PCT Filed: Oct. 9, 1998

(86) PCT No.: PCT/GB98/03049

§ 371 (c)(1), (2), (4) Date: Nov. 5, 1998

(87) PCT Pub. No.: WO99/21173

PCT Pub. Date: Apr. 29, 1999

(30) Foreign Application Priority Data

Oct. 22, 1997 (EP) .......................................... 97308429

(51) Int. Cl.[7] .............................................. H04N 17/00

(52) U.S. Cl. ...................... 348/192; 382/141; 382/155; 704/228; 704/229

(58) Field of Search ................................ 382/155, 141; 704/228, 229, 230, 233; 348/192

(56) References Cited

U.S. PATENT DOCUMENTS 4,860,360 A * 8/1989 Boggs ......................... 381/48
5,301,019 A * 4/1994 Citta .......................... 348/416
5,596,364 A * 1/1997 Wolf et al. ................. 348/192
5,630,019 A * 5/1997 Kochi ......................... 395/22
5,794,188 A * 8/1998 Hollier ....................... 704/228

* cited by examiner

*Primary Examiner*—Phuoc Tran
*Assistant Examiner*—Ali Bayat
(74) *Attorney, Agent, or Firm*—Nixon & Vanderhye P.C.

(57) ABSTRACT

Communications equipment is tested for perceptually relevant distortions introduced by the equipment by generating indications of the extent to which such distortion would be perceptible to a human observer, and processing high-level application data received with the input stimulus and/or generated locally relating to the intended content of the input stimulus. This allows the perceptual relevance of different distortion types to be weighted in the final output from the perceptual layer according to the nature of the signal being transmitted. The high-level information may be of a general nature, defining the type of information content in the input signal (e.g. music or speech) or may be highly defined, e.g. the input signal accompanying a video input specifying which of a limited set of objects in a virtual world is to be depicted, such that a reference copy of the image, or characteristic features of such objects can be retrieved from a store. The high-level application data may be used for other purposes, e.g. to select a coding process suitable for the nature of the information content.

16 Claims, 4 Drawing Sheets

SIGNAL PROCESSING

BACKGROUND OF THE INVENTION

1. Field of the Invention

This invention relates to signal processing. It is of application to the testing of communications systems and installations, and to other uses as will be described. The term "communications system" covers telephone or television networks and equipment, public address systems, computer interfaces, and the 2. Description of Related Art It is desirable to use objective, repeatable, performance metrics to assess the acceptability of performance at the design, commissioning, and monitoring stages of communications services provision. However, subjective audio and video quality is central in determining customer satisfaction with products and services, so measurement of this aspect of the system's performance is important. The complexity of modern communications and broadcast systems, which may contain data reduction, renders conventional engineering metrics inadequate for the reliable prediction of perceived performance. Subjective testing can be used but is expensive, time consuming and often impractical particularly for field use. Objective assessment of the perceived (subjective) performance of complex systems has been enabled by the development of a new generation of measurement techniques, which take account of the properties of the human senses. For example, a poor signal-to-noise performance may result from an audible distortion, or from an inaudible distortion. A model of the masking that occurs in hearing is capable of distinguishing between these two cases.

Using models of the human senses to provide improved understanding of subjective performance is known as perceptual modelling.

The present applicant has a series of previous applications referring to perceptual models, and test signals suitable for non-linear speech systems:

WO 94/00922 Speech-like test-stimulus and perception based analysis to predict subjective performance.

WO 95/01011 Improved artificial-speech test-stimulus.

WO95/15035 Improved perception-based analysis with algorithmic interpretation of audible error subjectivity To determine the subjective relevance of errors in audio systems, and particularly speech systems, assessment algorithms have been developed based on models of human hearing. The prediction of audible differences between a degraded signal and a reference signal, can be thought of as the sensory layer of a perceptual analysis, while the subsequent categorisation of audible errors can be thought of as the perceptual layer. Models for assessing high quality audio, such as described by Paillard B, Mabilleau P, Morissette S, and Soumagne J, in "PERCEVAL: Perceptual Evaluation of the Quality of Audio Systems.", *J. Audio Eng. Soc.*, Vol. 40, No. ½, January/Febuary 1992, have tended only to predict the probability of detection of audible errors since any audible error is deemed to be unacceptable, while early speech models have tended to predict the presence of audible errors and then employ simple distance measures to categorise their subjective importance, e.g.

Hollier M P, Hawksford M O, Guard D R, "Characterisation of Communications Systems Using a Speech-Like Test Stimulus", *J. Audio Eng. Soc.*, Vol. 41, No. 12, December 1993.

Beerends J, Stemerdink J, "A Perceptual Audio Quality Measure Based on a Psychoacoustic Sound Representation", *J. Audio Eng. Soc.*, Vol. 40, No. 12, December 1992.

Wang S, Sekey A, Gersho A, "An Objective Measure for Predicting Subjective Quality of Speech Coders", *IEEE J. on Selected areas in Communications*, Vol. 10, No. 5, June 1992

It has been previously shown by Hollier M P, Hawksford M O, Guard D R, in "Error-activity and error entropy as a measure of psychoacoustic significance in the perceptual domain", *IEE Proc.-Vis. Image Signal Process.*, Vol. 141, No. 3, June 1994 that a more sophisticated description of the audible error provides an improved correlation with. subjective performance. In particular, the amount of error, distribution of error, and correlation of error with original signal have beer-shown to provide an improved prediction of error subjectivity.

FIG. 1 shows a hypothetical fragment of an error surface. The error descriptors used to predict the subjectivity of this error are necessarily multi-dimensional: no simple single dimensional metric can map between the error surface and the corresponding subjective opinion. The error descriptors, $E_d$, are in the form:

$$E_{d1}=fn_1\{e(i,j)\},$$

where $fn_1$ is a function of the error surface element values for descriptor 1. For example the error descriptor for the distribution of the error, Error-entropy ($E_a$), proposed by Hollier et al in the 1994 article cited above, was given by:

$$E_e=\sum_{i=1}^{n}\sum_{j=1}^{m}a(i,j)\ln a(i,j)$$

where: $a(i,j)=|e(i,j)|/E_a$ and: $E_a$ is the sum of $|e(i,j)|$ with respect to time and pitch.

Opinion prediction$=fn_2\{E_{d1}, E_{d2}, \ldots, E_{dn}\}$ where $fn_2$ is the mapping function between the n error descriptors and the opinion scale of interest.

It has been shown that a judicious choice of error descriptors can be mapped to a number of different subjective opinion scales [Hollier M P, Sheppeard P J, "Objective speech quality assessment: towards an engineering metric", Presented at the 100th AES Convention in Copenhagen, Preprint No. 4242, May 1996]. This is an important result since the error descriptors can be mapped to different opinion scales that are dominated by different aspects of error subjectivity. This result, together with laboratory experience, is taken to indicate that it is possible to weight a set of error descriptors to describe a range of error subjectivity since different features of the error are dominant for quality and effort opinion scales. The general approach of dividing the model architecture into sensory and perceptual layers and generating error descriptors that are sensitive to different aspects of error subjectivity is validated by these results.

A number of visual perceptual models are also under development and several have been proposed in the literature. For example, Watson A B, and Solomon J A, "Contrast gain control model fits masking data". *ARVO*,. 1995 propose the use of Gabor functions to account for the inhibitory and excitatory influences of orientation between masker and maskee. Ran X, and Farvadin N, "A perceptually motivated three-component image model-Part I: Description of the model", *IEEE transactions on image processing*, Vol. 4, No. 4 April 1995 use a simple image decomposition into edges, textures and backgrounds. However, most of the published algorithms only succeed in optimising individual aspects of model behaviour; Watson & Solomon provide a good model of masking, and Ran & Farvadin a first approximation to describing the subjective importance of errors.

An approach similar to that of the auditory perceptual model described above has been adopted by the present applicant for a visual perceptual model. A sensory layer reproduces the gross psychophysics of the sensory mechanisms:

(i) spatio-temporal sensitivity known as the "human visual filter", and (ii) masking due to spatial frequency, orientation and temporal frequency. Following the sensory layer the image is decomposed to allow calculation of error subjectivity, by the perceptual layer, according to the importance of errors in relation to structures within the image, as will now be described with reference to FIG. 2. The upper part of FIG. 2 illustrates an image to be decomposed, whilst lower part shows the decomposed image for error subjectivity prediction. If the visible error coincides with a critical feature of the image, such as an edge, then it is more subjectively disturbing. The basic image elements, which allow a human observer to perceive the image content, can be thought of as a set of abstracted boundaries. These boundaries can be formed by colour differences, texture changes and movement as well as edges, and are identified in the decomposed image. Even some Gestalt effects, which cause a boundary to be perceived, can be algorithmically predicted to allow appropriate weighting. Such Gestalt effects are described by Gordon I E, in "*Theories of Visual Perception*", John Wiley and Sons, 1989. These boundaries are required in order to perceive image content and this is why visible errors that degrade these boundaries have greater subjective significance than those which do not. It is important to note that degradation of these boundaries can be deemed perceptually important without identifying what the high level cognitive content of the image might be. For example, degradation of a boundary will be subjectively important regardless of what the image portrays. The output from the perceptual layer is a set of context sensitive error descriptors that can be weighted differently to map to a variety of opinion criteria.

In order to assess a multi-media system it is necessary to combine the output from each sensory model and account for the interactions between the senses. It is possible to provide familiar examples of inter-sensory dependency, and these are useful as a starting point for discussion, despite the more sophisticated examples that soon emerge. Strong multi-sensory rules are already known and exploited by content providers, especially film makers. Consistent audio/video trajectories between scene cuts, and the constructive benefit of combined audio and video cues are examples. Exploitation of this type of multi-modal relationship for human computer interface design is discussed by May J and Barnard P, "*Cinematography and interface design*", in K. Norbdy et al *Human Computer Interaction, Interact* '95 (26–31), 1995. Less familiar examples include the misperception of speech when audio and video cues are mismatched, as described by McGurk H, and MacDonald J, in "Hearing lips and seeing voices", *Nature*, 264 (510–518), 1976, and modification of error subjectivity with sequencing effects in the other modality, e.g. O'Leary A, and Rhodes G, in "Cross-modal effects on visual and auditory perception", *Perception and psychophysics*, 35 (565–569), 1984.

The interaction between the senses can be complex and the significance of transmission errors and choice of bandwidth utilisation for multi-media services and "Telepresence" is correspondingly difficult to determine. This difficulty highlights the need for objective measures of the perceived performance of multi-media systems. Fortunately, to produce useful engineering tools, it is not necessary to model the full extent of human perception and cognition, but rather to establish and model the gross underlying (low level) inter-sensory dependencies.

FIG. 3 shows a diagrammatic representation of a prior art sensory perceptual model including cross modal dependencies and the influence of task. The main components, to be described in more detail later with reference to FIG. 4 are:

auditory and visual sensory models 10, 20;

a cross-modal model 30, scenario-specific task model 40.

To date perceptual models have operated only in response to the properties of their audio and/or video input signals which can be determined using signal analysis techniques such as:

spectral analysis, energy and time measurements, and mathematical transforms via linear and non-linear functions.

Such models may be referred to as "implicational" models since they operate only on information which can be inferred from the signal and do not include the capability to determine or test propositions in the way a human subject would when assessing system performance. However, the nature of the application in which the signal is to be used influences the user's perception of the systems' performance in handling these signals, as well as the nature of the signals themselves.

A problem with the perceptual models described in the prior art are that they are "implicational" models: that is, they rely on features that can be inferred from the audio and video signals themselves. Typically, they are specific to one particular application, for example telephony-bandwidth speech quality assessment. If the application is not known, perceptual weightings cannot be derived from the signal without making assumptions about the intended application. For example, this approach could result in perceptual weightings being applied to regions of an image that, due to the image content or propositional considerations, are not subjectively important. Similarly, in an audio signal, phonetic errors may be more tolerable if the transmission is a song than if it is speech, but pitch errors may be less tolerable.

Proposals for the future MPEG7 video signalling standard include the use of high-level application data in the form of content descriptors accompanying the video data, intended to facilitate intelligent searches and indexing. Such content descriptors can be used to identify both the intended use of the signal (for example video conference or feature film) and the nature of the image or sound portrayed by the signal, (for example human faces, or graphical items such as text).

SUMMARY OF THE INVENTION

According to the invention, there is provided a method of processing an input stimulus having a plurality of components, to produce an output dependant on the components, the method comprising the step of using high level application data associated with the stimulus to weight the subjective importance of the components of the stimulus such that the output is adapted according to the high level application data.

According to another aspect, there is provided apparatus for processing an input stimulus having a plurality of components, the apparatus comprising processing means for processing the plurality of components, to produce an output dependant on the components, and for processing high level application data associated with the stimulus such that the output is adapted according to the high level application data.

The process according to the invention, which makes use of higher level (cognitive) knowledge about content, will be referred to in the following description as a "propositional" model. The high-level application information used may be content descriptors, as described above, or locally stored information.

In one application of the invention, the information may be used in a method of testing communications equipment, wherein the high-level application data relates to the nature of the signal being received, the method comprising the detection of distortions in an input stimulus received through the communications equipment under test, determination of the extent to which the distortion would be perceptible to a human observer, and the generation of an output indicative of the subjective effect of the distortions in accordance with the said distortions, weighted according to the high level application data. The distorted input stimulus may be analysed for actual information content, a comparison is made between the actual and intended information content, and the output generated is indicative of the extent of agreement between the intended and actual information content.

It is known that the subjectivity of errors occurring in speech is different to that of errors occurring in music. It follows that if a high-level (propositional) input indicates whether the audio signal encountered is speech or music, the behaviour of the perceptual model could be adapted accordingly. This distinction could be further divided between different types of music signal and levels of service quality. For example, synchronisation between sound and vision is more significant in, for example, a video transmission of a musical concert, showing the performers, than it is in a transmission where music is merely provided as a background to the action on a video image.

Similarly, in a video image, graphical information, such as text, requires small-scale features to be reproduced accurately so that individual text characters can be identified, but requires little tracking of movement, as the text image is likely to be stationary or relatively slow moving. For a fast-moving image the relative importance of these characteristics is different.

Prior art systems optimised for one specific input type, e.g. speech, are non-optimal for others, e.g. music, and cannot vary their perceptual response according to the nature of the input signal to be analysed. The invention allows different weightings to be selected, according to the nature of the signal being received.

The high-level information may be used for purposes other than measuring perceived signal quality. For example, coder/decoders (codecs) exist which are specialised in processing different types of data. A codec suitable for moving images may have to sacrifice individual image quality for response time—and indeed perfect definition is unnecessary in a transient image—whereas a high-definition graphics system may require very high accuracy, though the image may take a comparatively long time to produce. By using the high-level information on the nature of the data being transmitted, a suitable codec may be selected for that data at any intermediate point in transmission, for example where a high-bandwidth transmission is to be fed over a narrow band link.

The invention has several potential applications. For example, the operation of a coder/decoder (codec) may be adapted according to the nature of the signals it is required to process. For example, there is a trade-off between speed and accuracy in any coding program, and real-time signals (e.g. speech) or video signals requiring movement, may benefit from the use of one codec, whilst a different codec may be appropriate if the signal is known to be text, where accuracy is more important than speed.

The invention may also be used for improving error detection, by allowing the process to produce results which are closer to subjective human perceptions of the quality of the signal. These perceptions depend to some extent on the nature of the information in the signal itself. The propositional model can be provided with high-level information indicating that the an intended (undisorted) input stimulus has various properties. For example, the high-level application data may relate to the intended information content of the input stimulus, and the distorted input stimulus can be analysed for actual information content, a comparison being made between the actual and intended information content, and the output generated being indicative of the extent of agreement between the intended and actual information content.

The high-level application data relating to the information content of the stimulus may be transmitted with the input stimulus, for processing by the receiving end. The receiver may instead retrieve high-level application data from a data store at the point of testing. Both methods may be used in conjunction, for example to transmit a coded message with the input stimulus to indicate which of a locally stored set of high level application data to retrieve. For example the transmitted high-level application data may comprise information relating to an image to be depicted, for comparison with stored data defining features characteristic of such images. In some circumstances the system may be configured to only depict a predetermined set of images, for example the object set of a virtual world. In this case the distorted image depicted in the received signal may be replaced by the image from the predetermined set most closely resembling it.

The input stimuli may contain audio, video, text, graphics or other information, and the high level application data may be used to influence the processing of any of the stimuli, or any combination of the stimuli.

In its simplest form the high-level information may simply specify the nature of the transmission being made, for example whether an audio signal carries speech or music. Speech and music require different perceptual quality measures. Distortion in a speech signal can be detected by the presence of sounds impossible for a human voice to produce, but such sounds may appear in music so different quality measures are required. Moreover, the audio bandwidth required for faithful reproduction of music is much greater than for speech, so distortion outside the speech band is of much greater significance in musical tranmissions than in speech.

The subjectivity of errors also differs between speech and music, and also between different types of speech task or music type. The relative importance of sound and vision may be significant to the overall perceived quality. A video transmission of a musical concert would require better audio quality than, for example, a transmission in which music is merely provided as background sound, and so high-level information relating to the nature of the transmission could be used to give greater or less weight to the audio component of the overall quality measure. Synchronisation of sound and vision may be of greater significance in some transmissions than others. In some circumstances, e.g. immersive environments, the relative significance of spatialistation effects (that is to say, the perceived direction of the sound source), may be greater, as compared with the fidelity of the reproduction of the sound itself, than in other circumstances such as an audio-only application.

In a teleconference, in which video images of the participants are displayed to each other, audio may in general be of greater importance than vision, but this may change during the course of the conference, for example if a document or other video image (e.g. a "whiteboard"-type graphics application) is to be studied by the participants. The change from one type of image to another could be signalled by transmission of high-level application data relating to the type of image currently being generated.

The high-level information may be more detailed. The perceptual models may be able to exploit the raising and testing of propositions by utilising the content descriptors proposed for the future MPEG7 standard. For example, it may indicate that an input image is of a human face, implicitly requiring generalised data to be retrieved from a local storage medium regarding the expected elements of such an object, e.g. number, relative positions and relative sizes of facial features, appropriate colouring, etc. Thus, given the propositional information that the input image is a face, a predominantly green image would be detected as an error, even though the image is sharp and stable, such that the prior art systems, (having no information as to the nature of the image, nor any way of processing such information), would detect no errors.

Moreover, the information would indicate which regions of the image (for example the eyes. and mouth) are likely to be of most significance in error perception. Moreover, the error subjectivity can be calculated to take account of the fact that certain patterns, such as the arrangement of features which make up a face, are readily identifiable to humans, and that human perceptive processes operate in specialised ways on such patterns.

The propositional (high-level) information may be specified in any suitable way, provided that the processing element can process the data. For example, the data may itself specify the essential elements, e.g. a table having a specified number of legs, so that if the input stimulus actually depicts an image with a number of legs different from that specified, an error would be detected. Again, it should be noted that if the image was sharp and suffered no colour aberrations etc, the prior art system would detect no subjectively important errors. The system of the invention may be of particular utility where the signals received relate to a "virtual environment" within which a known limited range of objects and properties can exist. In such cases the data relating to the objects depicted can be made very specific. It may even he possible in such cases to repair the images, by replacing an input image object which is not one of the range of permitted objects, (having been corrupted in transmission) by the permitted object most closely resembling the input image object.

The propositions tested in virtual environments may be different from those reasonable in a natural environment. In a natural physical environment a normal proposition to be tested would be that an object in free space will fall. In a virtual environment this will not always be true since it would be possible, and potentially advantageous, to define some objects which remain where they are placed in space and not subject to gravity. Therefore, a propositional model may advantageously raise and test propositions which do not relate only to natural physical systems or conventional expected behaviour. Similarly, a propositional model may advantageously interpret propositional knowledge about a signal in a modified way depending on the task undertaken, or may ignore propositional information and revert to implicational operation where this is deemed advantageous.

BRIEF DESCRIPTION OF THE DRAWINGS

An embodiment of the invention will now be described in greater detail with reference to the Figures, in which.

DETAILED DESCRIPTION OF EXEMPLARY EMBODIMENTS

Figure 1:
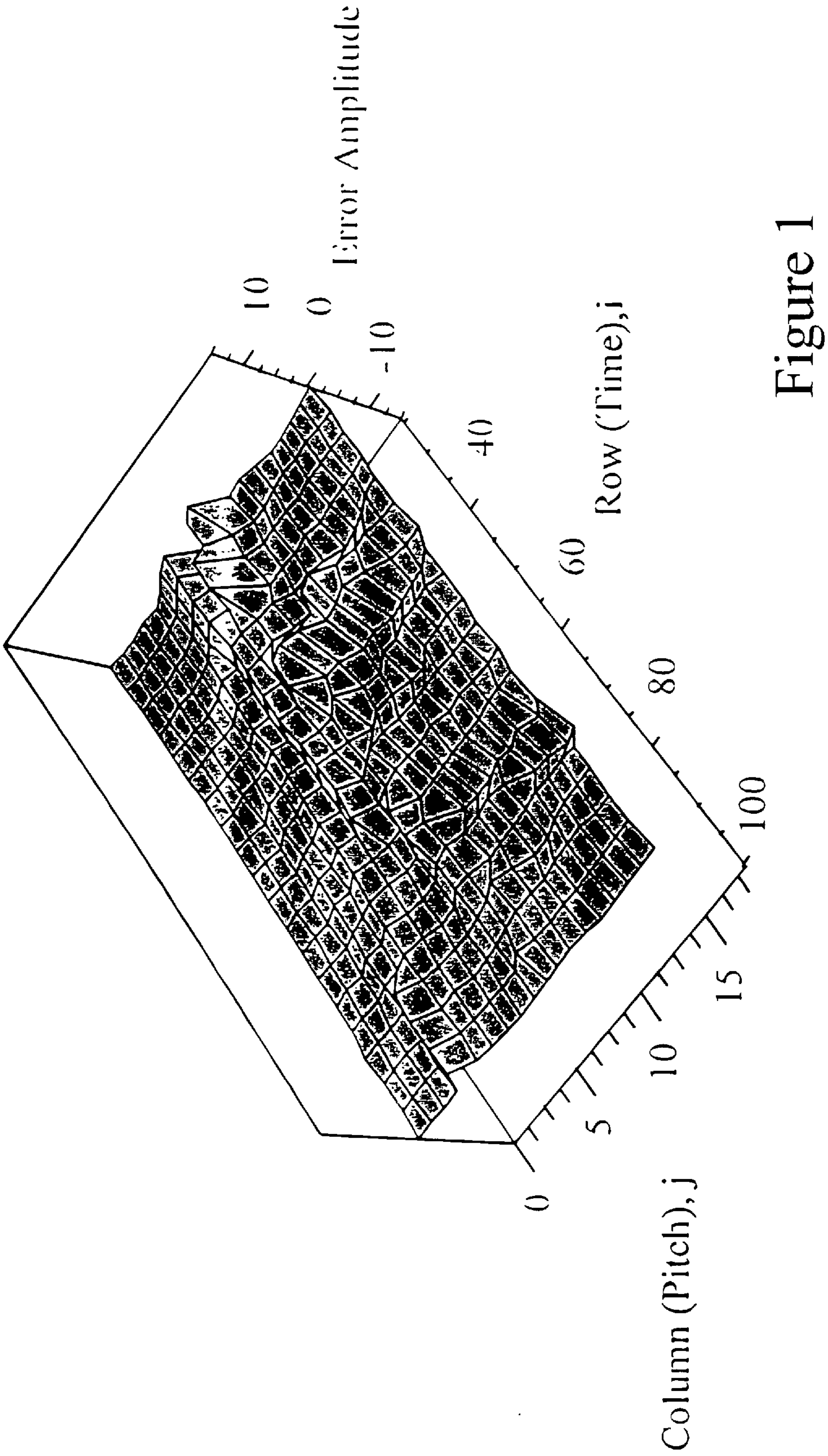
FIG. 1 illustrates a fragment of an audible error surface.
Figure 2:
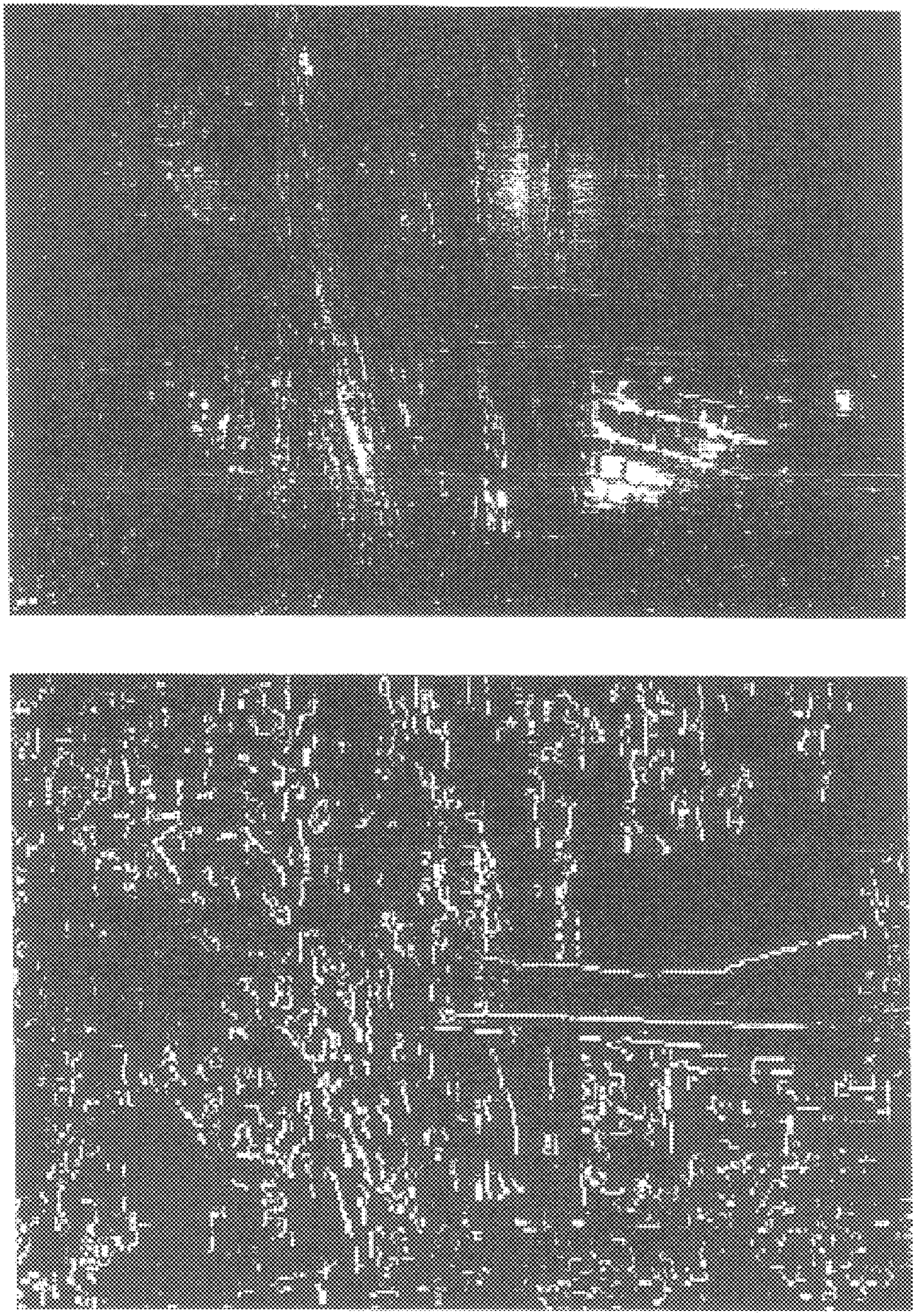
FIG. 2 illustrates image decomposition for error subjectivity prediction
Figure 3:
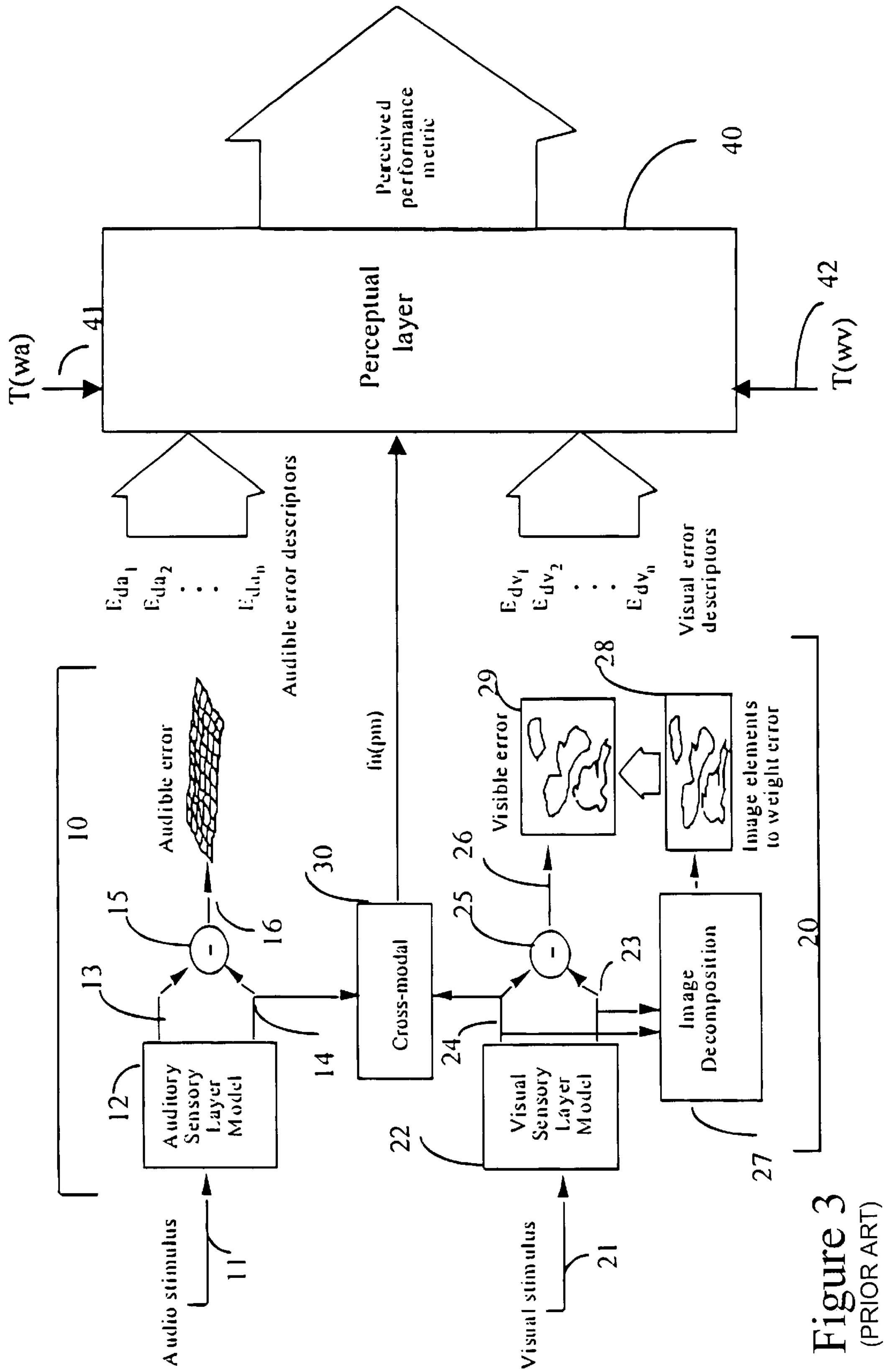
Figure 3 (PRIOR ART)
FIG. 3 is a diagrammatic representation of a prior art multi-sensory perceptual model including cross modal dependencies and the influence of task

FIGS. 1, 2 and 3 have already been briefly referred to. A practical model which can exploit propositional input information according to the invention will now be described with reference to FIG. 4, which illustrates the conceptual elements of the embodiment, which is conveniently embodied in software to be run on a general-purpose computer. The general layout is similar to that of the prior art arrangement of FIG. 3, but with further inputs 51, 61 associated with the audio and visual stimuli 11, 21 respectively. This information can be supplied either by additional data components accompanying the input stimuli, e.g. according to the MPEG7 proposals already referred to, or contextual information about the properties which may exist within a virtual environment, e.g. a local copy of the virtual world, stored within the perceptual layer 40. In the latter case the local virtual world model could be used to test the plausibility of signal interactions within known constraints, and the existence of image structures within a library of available objects.

Figure 4:
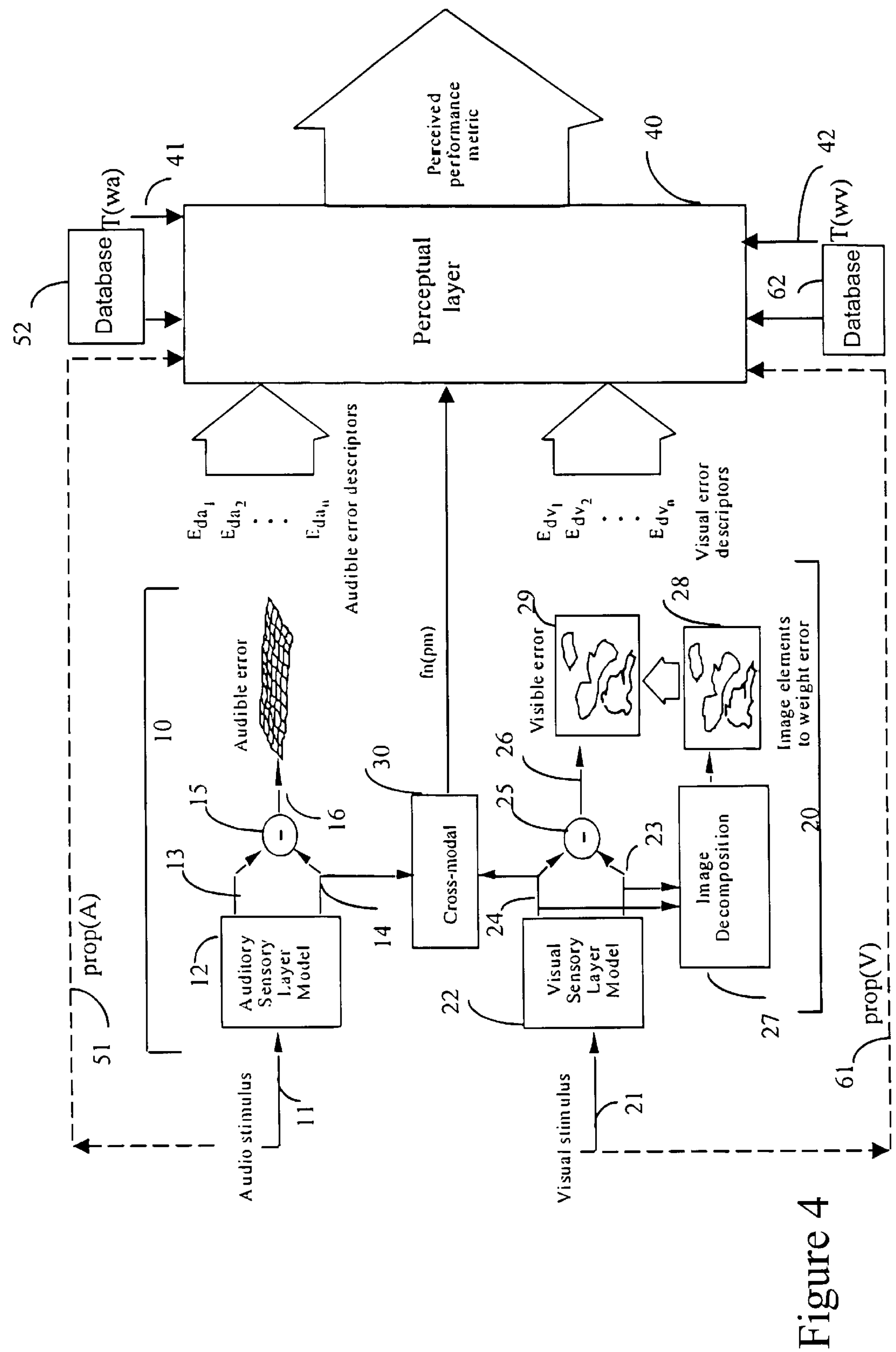
FIG. 4 is a diagrammatic representation of a similar multi-sensory perceptual model, modified according to the invention.

Most of the components shown in FIG. 4 are common with those of the system shown in FIG. 3, and these will be described first.

An auditory sensory layer model component 10 comprises an input 11 for the audio stimulus, which is provided to an auditory sensory layer model 12 which measures the perceptual importance of the various auditory bands and time elements of the stimulus and generates an output 16 representative of the audible error as a function of auditory band and time. This audible error may be derived by comparison of the perceptually modified audio stimulus 13 and a reference signal 14, the difference being determined by a subtraction unit 15 to provide an output 16 in the form of a matrix of subjective error as a function of auditory band and time, defined by a series of coefficients $E_{da1}$, $E_{da2}$, . . . , $E_{dan}$. Alternatively the model may produce the output 16 without the use of a reference signal, for example according to the method described in international patent specification number WO96/06496. The auditory error matrix can be represented as an audible error "surface", as depicted in FIG. 1, in which the coefficients $E_{da1}$, $E_{da2}$, . . . , $E_{dan}$ are plotted against time and the auditory bands.

A similar process takes place with respect to the visual sensory layer model 20. However, in this context a further step is required. The image generated by the visual sensory layer model 22 is analysed in an image decomposition unit 27 to identify elements in which errors are particularly significant, and weighted accordingly, as described in international patent specification number WO97/32428 and already discussed in the present specification with reference to FIG. 2. This provides a weighting function for those elements of the image which are perceptually the most important. In particular, boundaries are perceptually more important than errors within the body of an image element. The weighting functions generated in the weighting generator 28 are then applied to the output 26 in a visible error calculation unit 29 to produce a "visible error matrix" analogous to that of the audible error matrix described above. The matrix can be defined by a series of coefficients $E_{dv1}$, $E_{dv2}$, . . . , $E_{dvn}$. Images are themselves two-dimensional, so for a moving image the visible error matrix will have at least three dimensions.

It should also be noted that the individual coefficients in the audible and visible error matrices may be vector properties.

In the system depicted there are both audio and visual stimuli 11, 21 and there are therefore a number of cross-modal effects which can affect the perceived quality of the signal. The main effects to be modelled by the cross-modal model 30 are the quality balance between modalities (vision and audio) and timing effects correlating between the modalities. Such timing effects may include sequencing (event sequences in one modality affecting user sensitivity to events in another) and synchronisation (correlation between events in different modalities).

Error subjectivity also depends on the task involved. High level cognitive preconceptions associated with the task, the attention split between modalities, the degree of stress introduced by the task, and the level of experience of the user all have an effect on the subjective perception of quality.

A mathematical structure for the model can be summarised:

$E_{da1}$, $E_{da2}$, . . . , $E_{dan}$ are the audio error descriptors, and $E_{dv1}$, $E_{dv2}$, . . . , $E_{dvn}$ are the video error descriptors.

Then, for a given task:

$fn_{aws}$ is the weighted function to calculate audio error subjectivity, $fn_{vws}$ is the weighted function to calculate video error subjectivity, and $fn_{pm}$ is the cross-modal combining function.

The task-specific perceived performance metric, PM, output from the model 40 is then:

$$PM=fn_{pm}[fn_{aws}\{E_{da1}, E_{da2}, \ldots, E_{dan}\}, fn_{vws}\{E_{dv1}, E_{dv2}, \ldots, E_{dvn}\}]$$

The perceptual layer model 40 may be configured for a specific task, or may be configurable by additional variable inputs $T_{wa}$, $T_{wv}$ to the model (inputs 41, 42), indicative of the nature of the task to be carried out, which varies the weightings in the function $fn_{pm}$ according to the task. For example, in a video-conferencing facility, the quality of the audio signal is generally more important than that of the visual signal. However, if the video conference switches from a view of the individuals taking part in the conference to a document to be studied, the visual significance of the image becomes more important, affecting what weighting is appropriate between the visual and auditory elements.

Alternatively the functions $fn_{aws}$, $fn_{vws}$ may themselves be made functions of the task weightings, allowing the relative importance of individual coefficients $E_{da1}$, $E_{dv1}$ etc to be varied according to the task involved giving a prediction of the performance metric, PM' as:

$$PM'=fn'_{pm}[fn'_{aws}\{E_{da1}, E_{da2}, \ldots, E_{dan}, T_{wa}\}, fn'_{vws}\{E_{dv1}, E_{dv2}, \ldots, E_{dvn}, T_{wv}\}]$$

In FIG. 4 an additional signal prop(A) accompanying the audio stimulus 11 and/or an additional signal prop(V) accompanying the visual stimulus 21 is applied directly to the perceptual layer model as an additional variable 51, 61 respectively in the performance metric functions. This stimulus indicates the nature of the sound or image to which the stimulus relates and can be encoded by any suitable data input e.g. as part of the proposed MPEG7 bit stream, or in the form of a local copy of the virtual world represented by the visual stimulus 21. The modified perceptual layer 40 of FIG. 4 compares the perceived image with that which the encoded inputs 51, 61 indicate should be present in the received image, and generate an additional weighting factor according to how closely the actual stimulus, 11, 21 relates to data appropriate to the perceptual data 51, 61, applied to the perceptual layer. The inputs 51, 61 are compared to the perceptual layer 40 with data stored in corresponding databases 52, 62 to identify the necessary weightings required for the individual propositional situation.

Where the propositional information relates to the objects depicted in more detail, as distinct from the nature of the stimulus (music, speech, etc.) stored data 52, 62 provides data on the nature of the images to be expected, which are compared with the actual images/sounds in the input stimulus 11, 21, to generate a weighting.

The data inputs 52, 62 may also provide data relevant to the context in which the data is received, either preprogrammed, or entered by the user. For example, in a teleconferencing application audio inputs are generally of relatively high importance in comparison with the video input, which merely produces an image of the other participants. However, if the receiving user has a hearing impediment, the video image becomes more significant. In particular, real-time video processing, and synchronisation of sound and vision, become of much greater importance if the user relies on lip-reading to overcome his hearing difficulties.

A mathematical structure for the model can be summarised as an extension of the multi-modal model described above. For the propositional input case a function $fn_{ppm}$ is defined as the prepositionally adjusted cross-modal combining function.

The task-related perceived performance metric $PM_{prop}$ carried out by the perceptual layer 40 therefore includes a propositional weighting, and is given by:

$$PM_{prop}=fn_{ppm}\{fn_{aws}\{E_{da1}, E_{da2}, \ldots, E_{dan}\}, fn_{vws}\{E_{dv1}, E_{dv2}, \ldots, E_{dvn}\}\}$$

Alternatively, terms $T_{pwa}$, $T_{pwv}$, similar to the terms $T_{wa}$, $T_{wv}$ previously discussed, which vary according to the task, could be applied to the individual weighting functions $fn_{aws}$, $fn_{vws}$, giving a performance metric, $PM'_{prop}$:

$$PM'_{prop}=fn'_{ppm}\{fn'_{aws}\{E_{da1}, E_{da2}, \ldots, E_{dan}, T_{pwa}\}, fn'_{vws}\{E_{dv1}, E_{dv2}, \ldots, E_{dvn}, T_{pwv}\}\}$$

$t_{pwa}$ is the prepositionally weighted task weighting for audio $t_{pwv}$ is the prepositionally weighted task weighting for video

What is claimed is:

1. A method of testing communications equipment, comprising:

detecting distortions in an input stimulus having a plurality of components received through the communications equipment under test, determining the extent to which the distortions would be perceptible to a human observer, generating an output indicative of the subjective effect of the distortions in accordance with the distortions, and using high level application data associated with the stimulus, and indicative of the nature of the transmission being made, the high level application data being in the form of descriptors of the content or the intended use of the data being transmitted, and the high level data being used to weight the subjective importance of the components of the stimulus;

wherein the high-level application data relates to the intended information content of the input stimulus, the distorted input stimulus is analysed for actual information content, a comparison is made between the actual and intended information content, and the output generated is indicative of the extent of agreement between the intended and actual information content.

2. A method according to claim 1, wherein the processing is an encoding process, the operation of which is adapted according to the high level application data.

3. A method according to claim 1, wherein the high-level application data is received with the input stimulus from a remote source.

4. A method according to claim 1, comprising the step of retrieving said high-level application data from a local data store.

5. A method as claimed is claim 1, wherein at least part of the said high-level application data relates to audio information.

6. A method as claimed in claim 1, wherein at least part of the said high-level application data relates to video information.

7. A method as claimed in claim 6, wherein the high-level application data comprises information relating to images depicted by the video information, and is compared with stored data defining characteristic features of said images.

8. A method as claimed in claim 7, wherein the image to be depicted is one of a predetermined set of images.

9. A method as claimed in claim 8, wherein the image depicted in the received signal is replaced by the image from the predetermined set most closely resembling it.

10. Apparatus for testing communications equipment, comprising:

means for receiving an input stimulus having a plurality of components through the communications equipment under test, processing means for detecting distortions in the plurality of components, perceptibility indication means for generating an indication of the extent to which the distortion of each component would be perceptible to a human observer, weighting means for processing high level application data associated with the stimulus and indicative of the nature of the transmission being made, the high level application data being in the form of descriptors of the content or the intended use of the data being transmitted, the weighting means being arranged to weight the subjective importance of the components of the stimulus according to the high level data, output generation means to generate an output in accordance with the output of the perceptibility indication means weighted according to the weightings generated by the weighting means; and means for analysing the distorted input stimulus for actual information content, comparison means for comparing actual and intended information content to generate an output indicative of the extent of agreement between the intended and actual information content.

11. Apparatus according to claim 10, wherein the processing means has means for weighting the perceptibility indications according to the perceptual relevance of different distortion types according to the high level application data, for generating an output indicative of the overall subjective effect of the distortions in the input stimulus.

12. Apparatus according to claim 10, comprising means for receiving high-level application data, relating to the information content of the stimulus, with the input stimulus.

13. Apparatus as claimed in claim 10, comprising comparison means for comparing high-level application data relating to the image depicted with stored data defining characteristic features of said image.

14. Apparatus according to claim 10, comprising an encoding means, and means for adapting the operation of the encoding means according to the high level application data.

15. Apparatus according to claim 10, comprising a data store for said high-level application data, and means for retrieving said high level application data from the data store.

16. Apparatus as claimed in claim 15, further comprising means for adapting the received signal by replacing an image depicted in the received signal by the image from the predetermined set most closely resembling it.

* * * * *